E. HOPKINSON.
TIRE CARRYING RIM.
APPLICATION FILED DEC. 10, 1910.
1,176,145.
Patented Mar. 21, 1916.
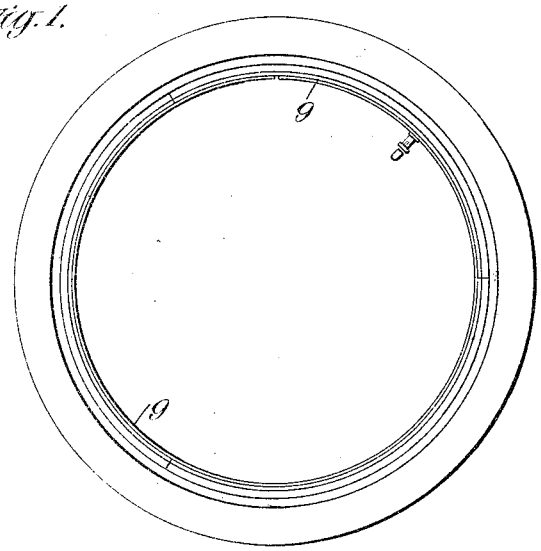
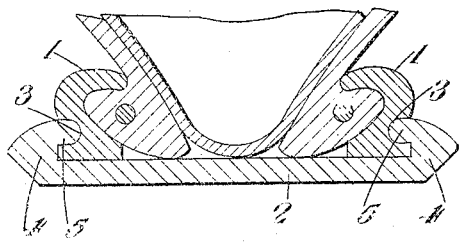
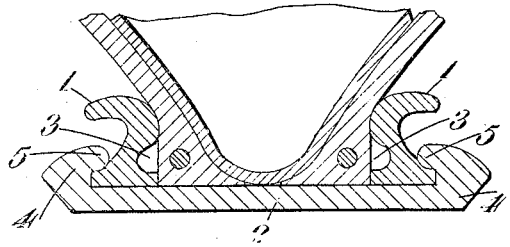
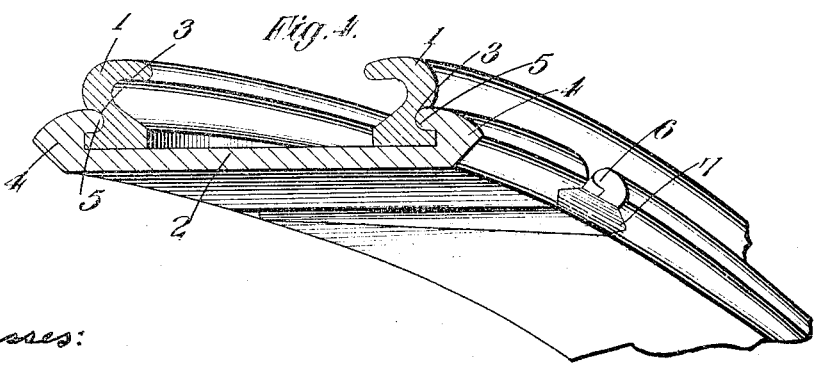
Witnesses:
Ernest Hopkinson
Inventor.

UNITED STATES PATENT OFFICE.

ERNEST HOPKINSON, OF EAST ORANGE, NEW JERSEY, ASSIGNOR TO UNITED STATES TIRE COMPANY, A CORPORATION OF NEW YORK.

TIRE-CARRYING RIM.

1,176,145.   Specification of Letters Patent.   Patented Mar. 21, 1916.

Application filed December 10, 1910. Serial No. 596,602.

*To all whom it may concern:*

Be it known that I, ERNEST HOPKINSON, a citizen of the United States of America, residing at East Orange, New Jersey, now temporarily residing in London, England, have invented a certain new and useful Improvement in Tire-Carrying Rims, of which the following is a specification.

The object of the present invention is to provide a tire-carrying rim, cheap of manufacture and efficient in operation, and capable of use in connection with both clencher and straight-sided tires. By "tire-carrying rim," I mean a construction which is adapted to carry a tire in an inflated condition, to be placed upon the felly band of a wheel, and there secured by any suitable means in such a manner as to be easily removable.

In the drawings I have illustrated a construction embodying the principles of my invention; although it will be understood that I do not limit myself to the precise construction described and shown.

In the drawings, Figure 1 is an elevation view of a rim made according to my invention. Fig. 2 is a cross section on an enlarged scale, showing the rim adapted for use in connection with a clencher tire. Fig. 3 is a view similar to Fig. 2, showing the rim for use in connection with a straight-sided tire. Fig. 4 is a view in cross section and perspective showing the under portion of the rim.

Referring to the drawings, like letters of reference, refer to like parts throughout the several views.

Referring to said drawings in detail 1 designates the side flanges for the tire, which are of the usual reversible endless-ring construction.

2 designates the base portion, which is preferably made in three arc sections, although if desired it may consist of a ring broken at only one point.

The side flanges 1 are each provided with a circumferential groove 3 adjacent their bases. The arc sections of the base are provided at each side with a circumferential flange 4, and a shoulder 5 fitting into the grooves 3 on the side flanges 1.

In Fig. 2 I have shown the parts as arranged for use in connection with a clencher tire, and have illustrated in skeleton outline the edges of the shoe of such a tire, and a portion of the inner tube. When the construction is used in connection with a straight-sided tire, the shoulders 5, fit over the base of the flanges 1 when they are reversed, as illustrated in Fig. 3.

Referring to Fig. 4, I have shown a bridge piece 6 for the purpose of maintaining the arc sections in circular relationship even if the tire is deflated and the shoulders on the flanges 4 should become disengaged from the grooves 3. This bridge piece is provided with the V-edges 7 engaging correspondingly shaped grooves in the abutting edges of the arc section of the base. In Fig. 1 I have illustrated another device for bridging the breaks in the arc sections. This consists of a broken ring 9, the ends of which engage the valve stem or any other suitable projection to maintain the ring in circular formation.

The operation of the device is as follows:—The tire being deflated and containing its inner tube, the side flanges 1 are placed in position. The arc section of the base which is provided at its central portion with the hole for the valve stem, is placed in position by threading the valve stem through the hole provided for its reception, pressing the base portion against the outer faces of the side flanges 1, until the shoulders 5 snap into position in the grooves 3, or above the base portion of the side flanges 1 when used in connection with a straight-sided tire. The remaining section or sections are similarly placed in position to complete the circle. If any device is used for bridging the arc sections these are placed in position and the tire is inflated to full riding pressure, the inflation acting to increase or press into closer engagement the side flanges of the tire with the side flanges on the base. If no bridge pieces are used the break between the arc sections will be as slight as possible, preferably not over $\frac{1}{32}$nd of an inch. If, however, it is desired to use some mechanical device to maintain the arc sections in circular relationship to each other independent of the spreading tendency of the tire, one or more of the breaks may be provided with a wedge piece 7, as illustrated in Fig. 4, or the broken ring construction shown at 9 in Fig. 1 may be adopted.

It will be seen that this construction affords a very simple construction, and one very cheap of manufacture. No special tools are necessary to operate the rim, and the arc sections may be made out of flat stock, cut to size and stamped to the proper arc of a circle, thus doing away with the necessity for rolling, welding and sizing necessary when the base is a complete circle.

Any appropriate means of securing the tire-carrying rim to the felly band may be availed of, none being here shown or described, as that constitutes no portion of the present invention.

It will be understood that the arc sections will be appropriately shaped to co-act with the particular means used for securing them to the felly band of a wheel.

What I claim and desire to secure by Letters Patent of the United States is:—

1. A tire-carrying rim comprising a flanged base section in the form of a broken ring whose flanges have undercut recesses, and a tire flange consisting of an endless ring having annular projections at the base thereof and adapted to enter said recesses.

2. A tire carrying rim comprising a base portion in the form of a broken ring having side flanges along each of the edges, said flanges being provided with undercut recesses, two tire flanges consisting of endless rings having annular projections at the bases thereof, each of which is adapted to enter said recesses.

3. A tire carrying rim comprising a base portion consisting of three arc sections having undercut side flanges, tire flanges consisting of endless rings having annular projections at the bases thereof whereby the tire flanges engage the side flanges of the arc sections.

4. A tire carrying rim comprising a flanged base portion in the form of a broken ring whose flanges have undercut recesses, and a tire flange consisting of an endless ring having symmetrical projections at each side of the base thereof and adapted to enter said recesses.

5. A tire carrying rim comprising a base portion in the form of a broken ring having side flanges along each side of its edges, said flanges being provided with undercut recesses, two tire flanges consisting of endless rings having symmetrical projections at each side of the bases thereof, each of which is adapted to enter said recesses.

6. A tire carrying rim comprising a base portion consisting of three arc sections having undercut side flanges, tire flanges consisting of endless rings having symmetrical projections at each side of the bases thereof whereby the tire flanges engage the side flanges of the arc sections.

7. A tire carrying rim comprising a base portion in the form of a broken ring having undercut side flanges along each of its edges, a wedge located at the break in the ring and two tire flanges consisting of endless rings provided with annular projections adapted to enter the undercut portions of the side flanges whereby the tire flanges and base portion are united.

In testimony whereof I affix my signature in presence of two witnesses.

ERNEST HOPKINSON.

Witnesses:
S. WENLO HOAR,
FRANK HUTTON.